Patented May 7, 1946

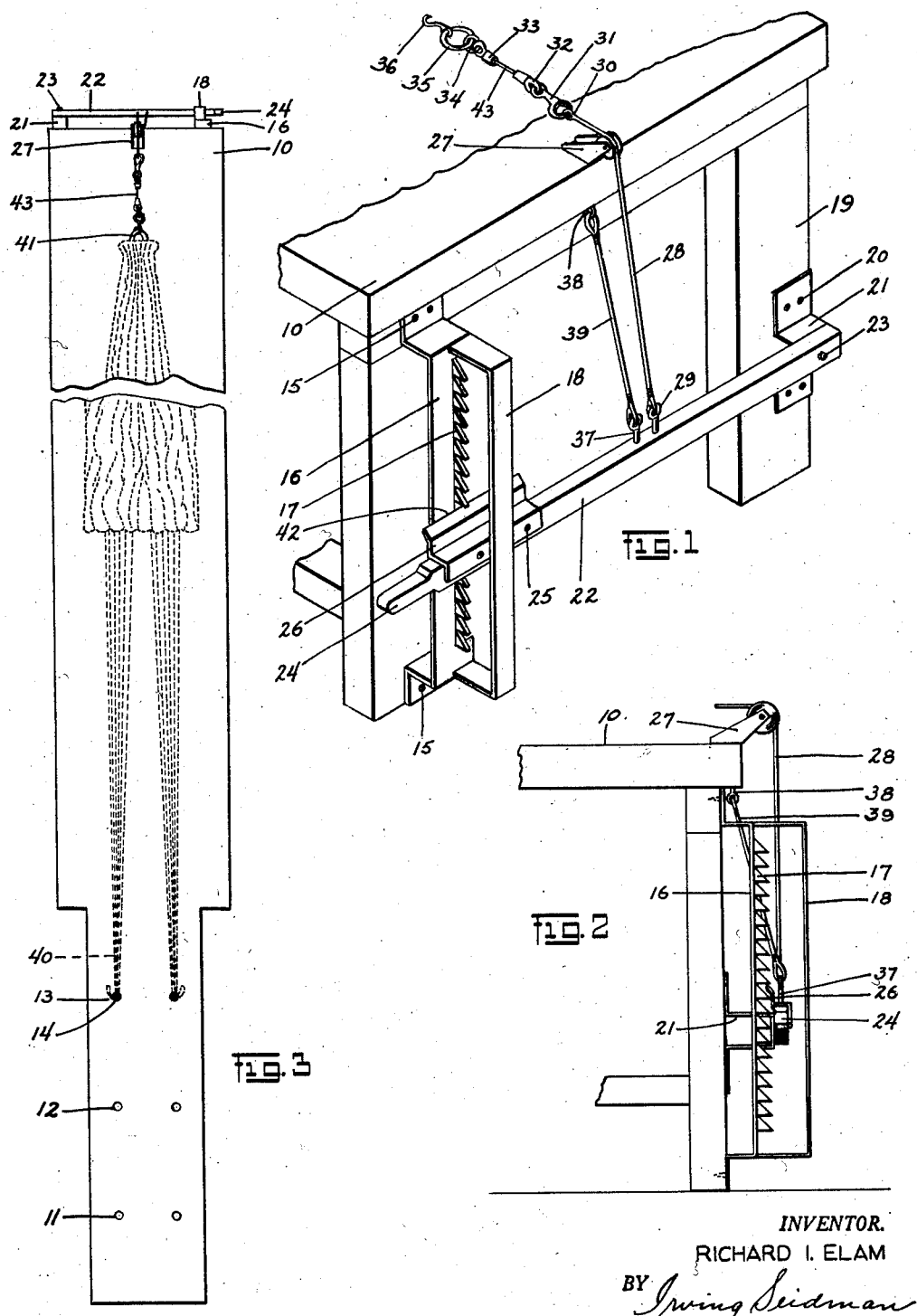

2,399,993

UNITED STATES PATENT OFFICE 2,399,993

PARACHUTE FOLDING DEVICE

Richard I. Elam, New York, N. Y., assignor to Pauline Elam Neulander, New York, N. Y.

Application June 23, 1944, Serial No. 541,840

2 Claims. (Cl. 254—77)

This invention relates to a parachute rigger's aid or parachute folding device.

Broadly, it is an object of my invention to provide a simple device which can easily be attached to a parachute packing table to eliminate the possibility of injuries caused by makeshift arrangements to the rigger or parachute. In many cases the rigger is injured by breaking prongs which hold the tension hooks and damage is caused to canopies by slipping and falling to the floor.

More particularly, it is an object of my invention to provide simple adjustments for stretching the parachute to the desired tautness.

Another object is to release the tension without disturbing the canopy preparatory to packing by allowing the canopy folds to remain in proper position.

Another object is to provide a simple device so that two men, one at the peak and one at the tension hooks, can stretch the parachute instantly thus saving considerable time and effort.

For a fuller understanding of the nature and objects of my invention, reference is had to the following detailed description in connection with the accompanying drawing, in which:

Fig. 1 is a perspective view of the rigger's helper attached to one end of a parachute packing table, the table being partly broken away.

Fig. 2 is a side view of the device shown in Fig. 1, and

Fig. 3 is a top view of a parachute packing table, partly broken through.

Referring to the drawing, numeral 10 represents a parachute packing table which may be of wood or metal or both, that is, the top may be of wood and the base of metal. Opposed bushings 11, 12 and 13 to receive tension hooks 14 are placed at one end of the table at desired distances to accommodate the different types of parachutes, such as, the attachable chest type, the QAC, the seat service type, etc.

The opposite end of the table has attached thereto by screws 15 and in vertical position a bent metal ratchet member 16, the teeth 17 of which may be stamped out of the metal and bent to the 90° angle, as shown. A guard 18 is attached to the ratchet member 16 for safety purposes.

Upon the leg 19 of the table and part of the way downward, there is attached by screws 20 a tension bar anchor 21, preferably made of bent metal, to which there is pivotally connected a tension bar 22 by pivot bolt 23. The end tension bar 22 opposite the pivot end is conveniently shaped to form a handle 24 near which is attached by screws 25 a tension bar plate 26, preferably made of bent metal, as shown. Tension bar 22 is preferably made of wood.

At the central end of the table 10 there is firmly attached a pulley 27 over the wheel of which a cable 28 passes, one end of which is attached to an eye-bolt 29 which is screwed into tension bar 22 directly below pulley 27. The opposite end of cable 28 has an eye 30 which engages a halyard ring 31 which in turn is connected to a terminal 32. Terminals 32 and 33 are connected to a flexible cable 43 which may be of any desired length. Terminal 33 is attached to a metal ring 34 which in turn is connected to another ring 35 having a hook 36 attached thereto.

Adjacent eye-bolt 29 there is a similar eye-bolt 37. Beneath table top 10, directly below pulley 27, there is an eye-bolt 38 and a flexible and resilient cable 39 is attached to eye-bolts 37 and 38.

In operation, the ends of the parachute cords 40 are firmly held in the bushings 11, 12 or 13, depending upon the length of the cords and the type of parachute, by tension hooks 14. The opposite end of the parachute has a loop or hook 41 which is attached to hook 36. Handle 24 of tension bar 22 is then pressed downward pulling the cable 28 and its upper cable assembly so that the parachute is stretched upon the table 10. The upper edge 42 of bar plate 26 is caught beneath ratchet teeth 17 and held because of the resilient cable 39 which has considerable stretchability and because of its position draws the tension bar 22 towards the table as can be clearly seen in Fig. 2. The parachute can then be folded in the desired position and properly packed.

It is obvious that various changes and modifications may be made in the details of construction without departing from the general spirit of the invention, as set forth in the appended claims.

I claim:

1. In combination, a parachute packing table with a tension unit, said tension unit comprising a vertical ratchet, a pivoted tension bar, means upon said tension bar for engaging the teeth of said ratchet, a cable unit terminating in a hook attached to said tension bar for engaging the loop of a parachute and a resilient member attached to said tension bar and said table for holding said tension bar upon said ratchet.

2. In combination, a parachute packing table with a tension unit, said tension unit comprising a vertical ratchet attached to one corner of said table, a tension bar pivoted at an adjacent corner of said table, a tension bar plate attached to said tension bar to engage the teeth of said ratchet, a cable unit terminating in a hook attached to said tension bar for engaging the loop of a parachute, a resilient member attached to said tension bar and said table for holding said tension bar upon said ratchet, and a guard for said ratchet and tension bar.

RICHARD I. ELAM.